(12) United States Patent
Hamada et al.

(10) Patent No.: US 6,519,453 B1
(45) Date of Patent: Feb. 11, 2003

(54) COMMUNICATION APPARATUS

(75) Inventors: Masashi Hamada, Tokyo (JP); Takatoshi Hirose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,276

(22) Filed: Jun. 29, 1999

(30) Foreign Application Priority Data

Jul. 1, 1998 (JP) .......................................... 10-199488

(51) Int. Cl.$^7$ ................................................ H04Q 7/00
(52) U.S. Cl. ........................ 455/432; 455/414; 455/445
(58) Field of Search .................. 455/412, 414, 455/415, 418, 419, 422, 450, 455, 62, 445, 458, 433, 435

(56) References Cited

U.S. PATENT DOCUMENTS

| 5,410,591 A | 4/1995 | Takahashi |
| 5,526,423 A | 6/1996 | Ohuchi et al. |
| 5,732,132 A | 3/1998 | Hamada |
| 5,771,457 A | 6/1998 | Tsutsui |
| 5,835,180 A | 11/1998 | Kakizawa |
| 5,867,563 A | 2/1999 | Kato et al. |
| 6,029,065 A | 2/2000 | Shah |
| 6,044,263 A * | 3/2000 | Valentine et al. ........... 455/435 |

FOREIGN PATENT DOCUMENTS

| EP | 0 597 638 A1 | 5/1994 |
| JP | 7-67174 | 3/1995 |
| US | 0877531 | * 11/1998 |
| WO | WO 98/23108 | 5/1998 |
| WO | WO 98/27782 | 6/1998 |

* cited by examiner

Primary Examiner—Thanh Cong Le
(74) Attorney, Agent, or Firm—Morgan & Finnegan L.L.P.

(57) ABSTRACT

A communication apparatus performing communication via a network transmits second data for requesting a service of a second network in accordance with first data inputted to request the service of a first network. When the operation procedure for requesting the service of the network is changed, the network notifies the communication apparatus of the operation procedure.

17 Claims, 12 Drawing Sheets

|  | SERVICE A | SERVICE B | SERVICE C | |
|---|---|---|---|---|
| INITIAL VALUE TABLE | #10 | #11 | #12 | 61 |
| OPERATION PROCEDURE TABLE | #10 | #11 | #12 | 62 |

|  | SERVICE A | SERVICE B | SERVICE C | |
|---|---|---|---|---|
| INITIAL VALUE TABLE | #10 | #11 | #12 | 61 |
| OPERATION PROCEDURE TABLE | #10 | #20 | 0 | 62A |

COMMUNICATION APPARATUS

BACKGROUND OF THE INVENTION

The present invention relates to a communication apparatus for performing communications via a network.

Conventionally, radio communication systems (PDC: Personal Digital Cellular system, PHS: Personal Handyphone System, and the like) that allow so-called roaming are known. In such system, a radio terminal moves from a service zone served by a telecommunications carrier to which the user himself/herself has subscribed and registered to a service zone served by another telecommunications carrier to perform communication.

Digital automobile telephone systems which download, to the moving terminal, service software (e.g., extension software for displaying charges during speech communication) unique to the roaming destination area in position registration processing are also known. In a digital automobile telephone system, however, the user is not informed of extension software unless the terminal registers its position. Additionally, in a digital automobile telephone system, services which require user's operation for reception of services provided by extension software are not taken into consideration.

SUMMARY OF THE INVENTION

It is an object of the present invention to provide a communication apparatus with good operability.

It is another object of the present invention to provide a communication apparatus which can be operated as in connection to a first network even in connection to the second network.

It is still another object of the present invention to notify a user that he/she cannot use a service.

It is still another object of the present invention to notify a communication terminal of a changed operation procedure for a service provided by a network when the operation procedure is changed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing an initial value table and operation procedure table upon power ON;

DETAILED DESCRIPTION OF THE PREFERRED EMBODIMENT

In this embodiment, as a candidate of an IMT 2000 (International Mobile Telecommunication 2000) system as a radio communication system assuming roaming, a mobile communication system of the wideband code division multiple access (W-CDMA (CDMA: Code Division Multiple Access)) scheme is shown. The present invention can be applied not only to the IMT 2000 but also to another network and a communication apparatus connected to another network.

Figure 1:
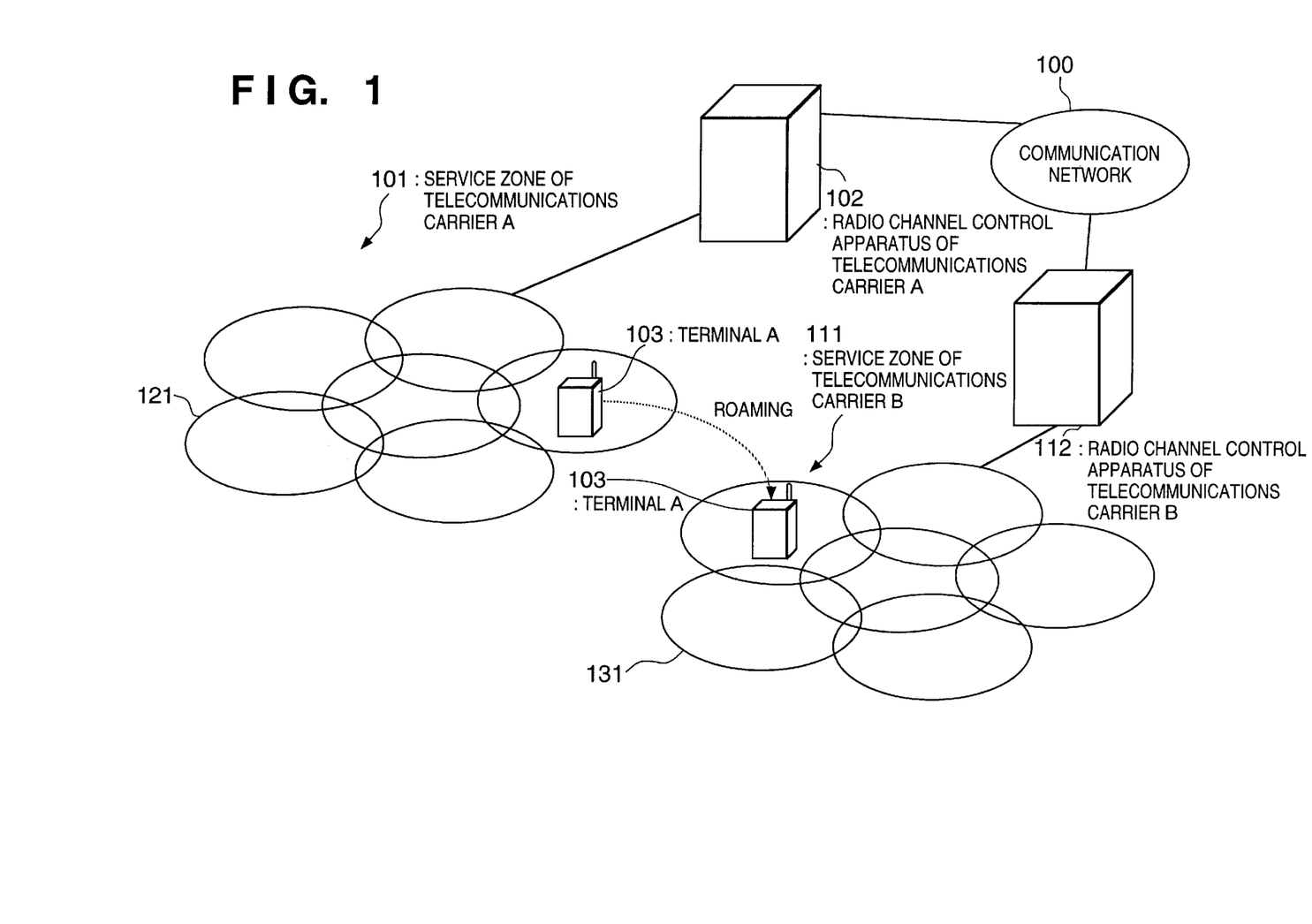
FIG. 1 is a view schematically showing roaming of a radio terminal apparatus in a mobile communication system.
Figure 2:
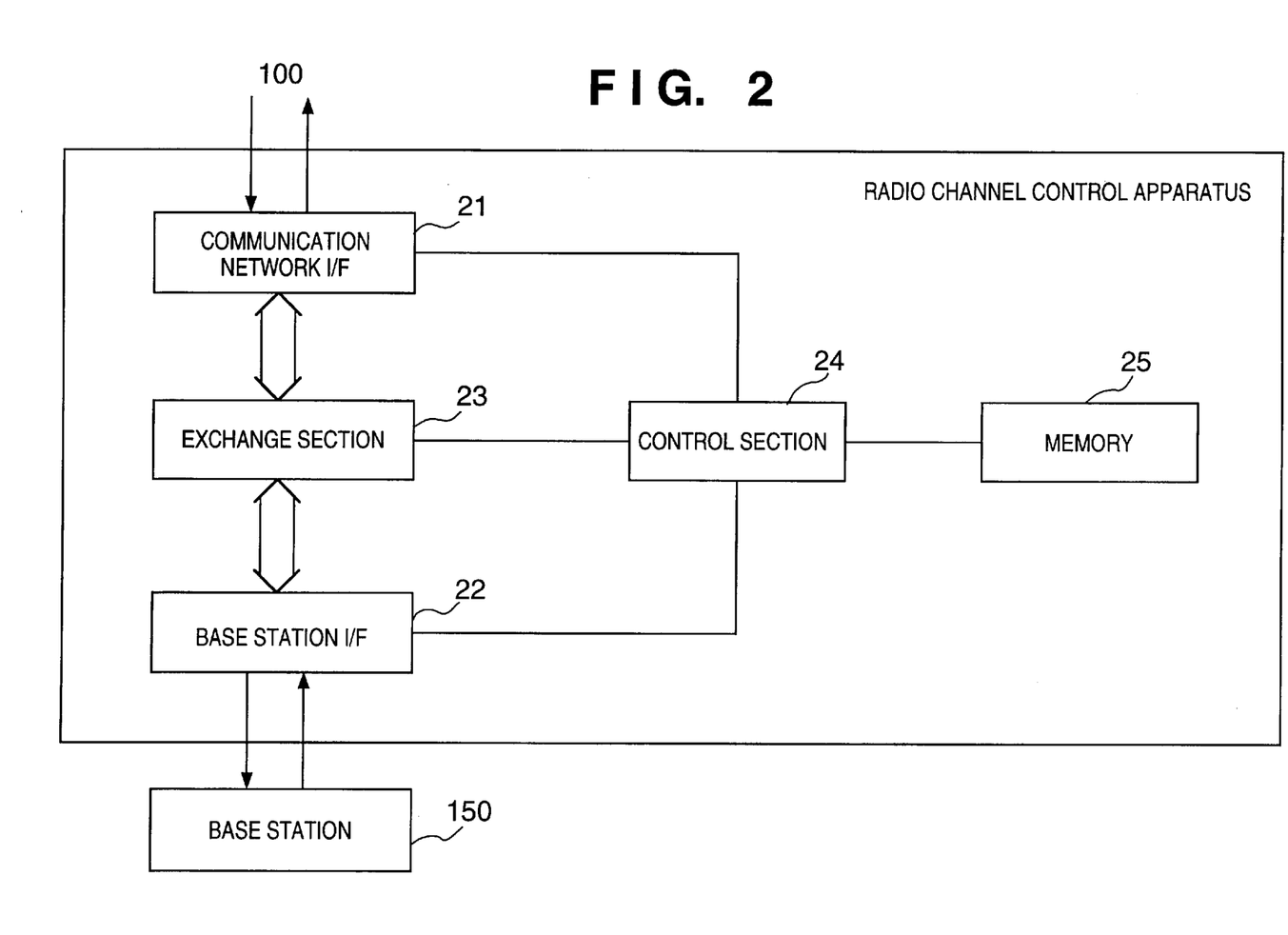
FIG. 2 is a block diagram showing the functional arrangement of a radio channel control apparatus.

FIG. 1 is a view schematically showing roaming of a radio terminal apparatus in the mobile communication system of the wideband CDMA (W-CDMA) scheme. Referring to FIG. 1, reference numerals 101 and 111 denote radio service zones provided by telecommunications carriers A and B. The radio service zones 101 and 111 combine cells 121 and 131 formed from base stations 150 (FIG. 2), respectively. Radio channel control apparatuses 102 and 112 of the telecommunications carriers A and B control the plurality of base stations 150 (FIG. 2). Reference numeral 100 denotes a communication network connecting the radio channel control apparatuses 102 and 112.

In this embodiment, a radio terminal A (103) which has subscribed and registered to the telecommunications carrier A can perform radio connection even when it moves to the service zone controlled by the telecommunications carrier B, so basic services such as making an outgoing call or receiving an incoming call are guaranteed.

In the mobile communication system of the wideband CDMA (W-CDMA) scheme, interfaces are standardized for the basic connection services, like the conventional portable telephone system. However, for additional services (e.g., transfer and automatic answering telephone services) provided by the individual telecommunications carriers, the contents and operation methods may be different between the telecommunications carriers due to the conditions (characteristics of backboard network or national policies) of the carriers.

For this reason, it is difficult for a terminal user to effectively use an additional service provided by a given telecommunications carrier at the roaming destination although the basic connection service is guaranteed even in this service zone, as in the current portable telephone system.

To solve this problem, in this embodiment, after terminal authentication processing terminates normally, contents and operation method of an additional service provided by a radio network are continuously allocated as needed to notify the radio terminal (roaming terminal) that is roaming of additional service information, thereby providing an environment where the roaming terminal can effectively use an additional service in the radio network.

FIG. 2 is a block diagram showing the arrangement of each of the radio channel control apparatuses 102 and 112 of this embodiment. The radio channel control apparatuses 102 and 112 have a common arrangement. Referring to FIG. 2, reference numeral 21 denotes a communication network interface for connecting the communication network 100; 22, a base station interface for connecting the base station 150; 23, an exchange section for connecting the communication network interface 21 to the base station interface 22; 24, a control section for controlling the communication network interface 21, base station interface 22, and exchange section 23; and 25, a memory storing information necessary for the control section 24.

Figure 3:
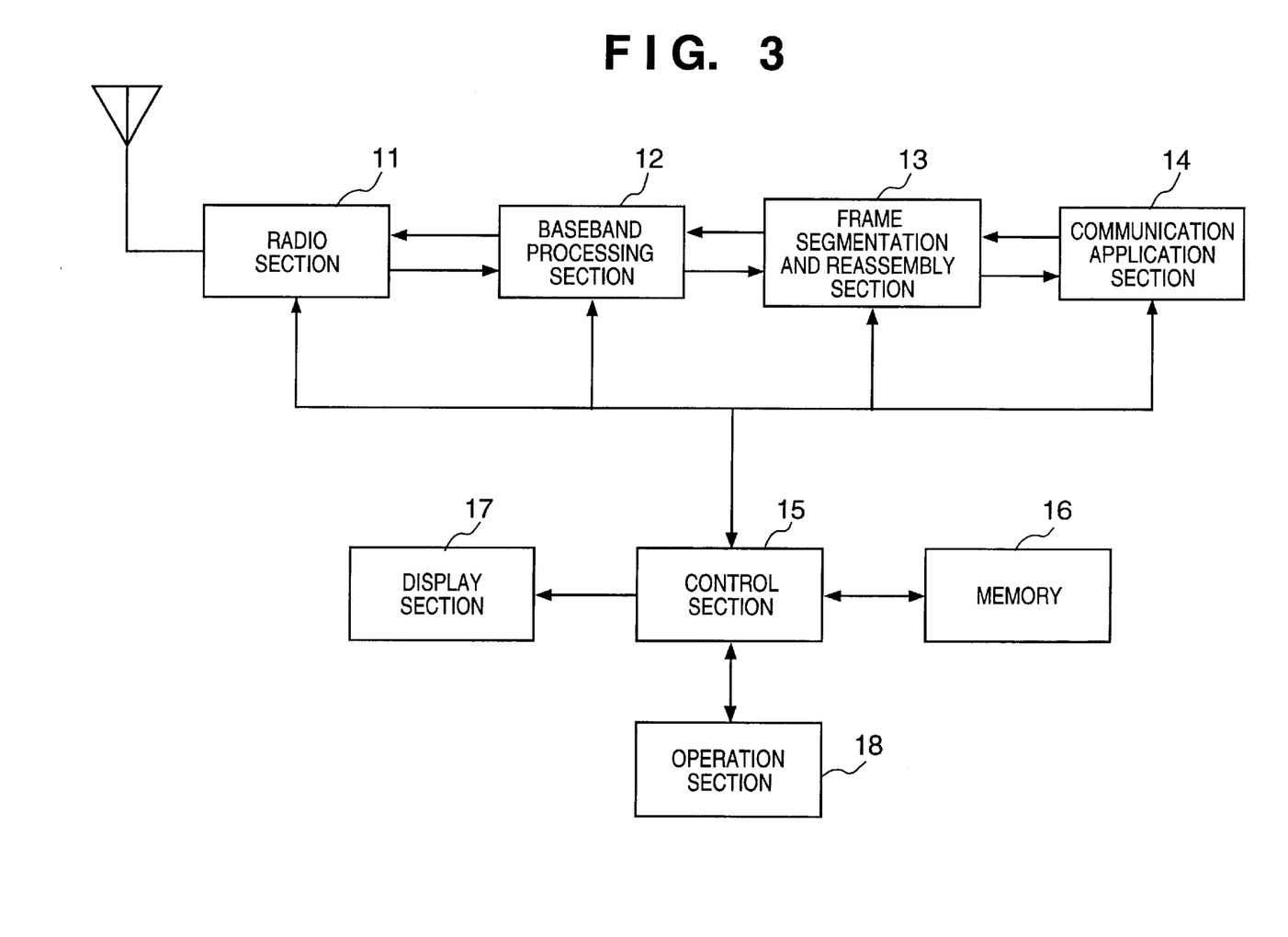
FIG. 3 is a block diagram showing the functional arrangement of the radio terminal apparatus.

FIG. 3 is a block diagram showing the functional arrangement of the radio terminal 103 of this embodiment. Referring to FIG. 3, reference numeral 11 denotes a radio section for transmitting/receiving a radio wave; 12, a baseband processing section for performing modulation/demodulation; 13, a frame segmentation and reassembly section for segmenting/reassembling transmission/reception data in units of frames; 14, various communication applications; 15, a control section for controlling radio communication and communication applications; 16, a memory storing information necessary for the control section 15; 17, a display section; and 18, an operation section.

Figure 4:
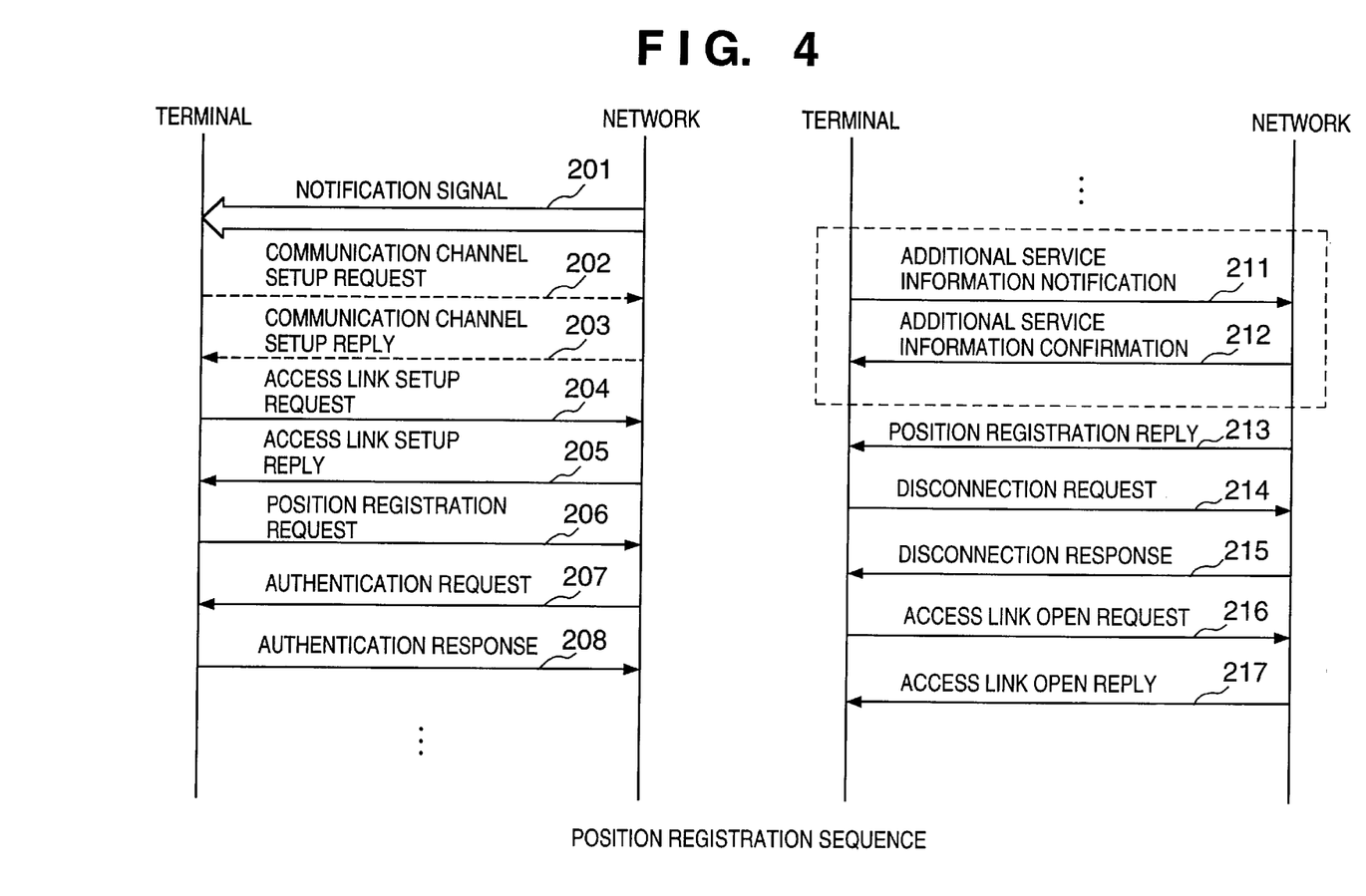
FIG. 4 is a view showing a procedure of notifying a user of additional service information in executing the position registration sequence in a mobile communication system of the wideband CDMA (W-CDMA) scheme.

FIG. 4 is a view showing a procedure of notifying a user of additional service information in executing the position registration sequence in the mobile communication system of the wideband CDMA (W-CDMA) scheme. Additional service information includes an operation method for reception of an additional service and service charge information. Referring to FIG. 4, reference numeral 201 denotes a notification signal with which a base station on the radio network side notifies the user of information of the network to which the base station belongs (e.g., telecommunications carrier information or base station identification information).

Triggered by the terminal 103 which recognizes necessity of position registration processing because of start of the terminal or its movement to a different cell, communication channel setup (communication channel setup request 202 and communication channel setup reply 203) and access link setup (access link setup request 204 and access link setup reply 205) are performed between the radio communication network (radio channel control apparatus 102 or 112) that is transmitting a notification signal and the terminal 103.

When connection for transmission/reception of logic control information to/from the network is established, the terminal side sends a position registration request 206.

Upon receiving this request, the network performs authentication processing (authentication request 207 and authentication response 208) between the network and terminal and confirms that the terminal is not an illicit terminal.

When the control section 24 determines with reference to the memory 25 that it is necessary (e.g., when this terminal registers its position in this service zone for the first time), the network side notifies the terminal of information 211 including contents and operation method for additional services it provides. After it is confirmed that the terminal has normally received the additional service information (212), the network returns a position registration reply 213.

The memory 25 stores the IDs of terminals whose positions are registered. The control section 24 determines whether the ID of the terminal 103 contained in the position registration request 206 is registered in the memory 25. If the ID is not registered, the control section 24 determines that the terminal 103 has registered its position for the first time, and notifies the terminal 103 of the additional service information 211.

The radio channel control apparatuses 102 and 112 independently store terminal IDs in the memories 25. The ID of the terminal 103 which has subscribed and registered to the telecommunications carrier A is stored in the memory 25 of the radio channel control apparatus 102. However, before the terminal 103 registers its position to the telecommunications carrier B, the ID is not stored in the memory 25 of the radio channel control apparatus 112. When the position of the terminal 103 is registered at the telecommunications carrier B for the first time, the control section 24 of the radio channel control apparatus 112 determines that it is position registration for the first time because the ID of the terminal 103 is not stored in the memory 25 of the radio channel control apparatus 112, and notifies the terminal 103 of the additional service information 211.

Information representing additional services provided by the telecommunications carrier is also stored in the memory 25. The control section 24 reads out the information representing additional services from the memory 25 and notifies the terminal 103 of it.

Logic information transmission/reception is ended. After the logic link is disconnected by starting the terminal (disconnection request 214 and disconnection response 215), the access link is disconnected (access link open request 216 and access link open reply 217), and the radio channel is disconnected.

After authentication/confirmation processing performed in radio channel connection between the network and radio terminal, the terminal is notified, by the display section 17, of information of additional services provided by the radio network, as needed. With this arrangement, a new radio terminal user who has registered at the radio network upon roaming can know the contents and use method of additional services of the network, so better services can be provided to the radio terminal user at the roaming destination.

Figure 12:
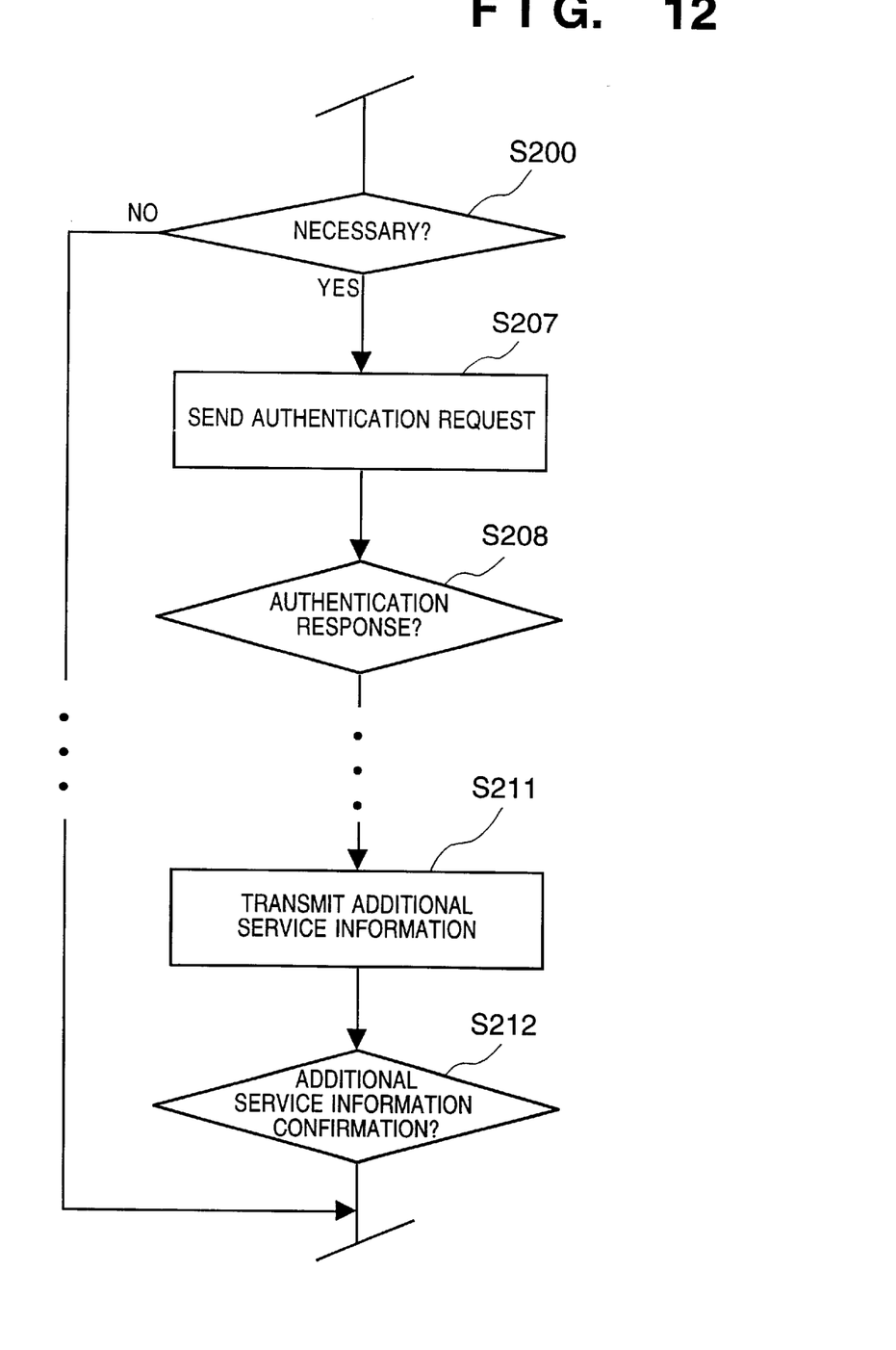
FIG. 12 is a flow chart showing the processing procedure of the radio channel control apparatus.

FIG. 12 is a flow chart showing part of a program read out from the memory 25 by the control section 24 as a computer. Referring to FIG. 12, S207, S208, S211, and S212 correspond to 207, 208, 211, and 212 in FIG. 4. In step S200, when the control section 24 determines that the terminal need be notified of additional service information, the control section 24 performs processing from step S207.

An operation in which the radio terminal apparatus receives additional service notification information in position information registration processing, registers the operation procedure in the memory 16 of the terminal, and converts the operation procedure in additional service operation will be described.

Figure 5:
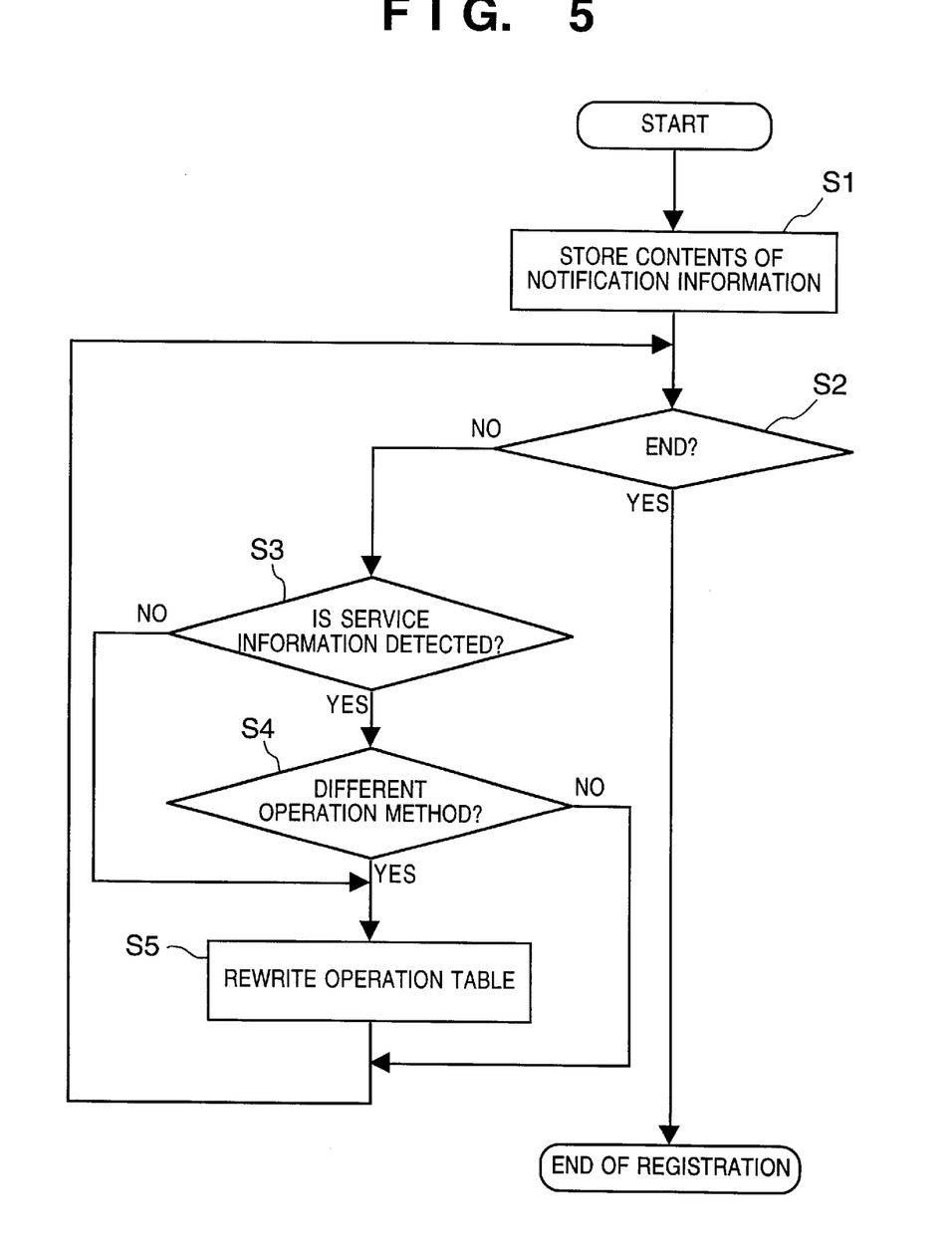
FIG. 5 is a flow chart showing the internal processing procedure of the radio terminal apparatus after reception of an additional service information notification signal.

The radio terminal apparatus starts a series of processing operations upon receiving the signal of additional service information notification 211 in accordance with the above-described position information registration sequence shown in FIG. 4. FIG. 5 is a flow chart showing the internal processing procedure of the radio terminal apparatus after reception of the signal of additional service information notification 211.

Figure 6:
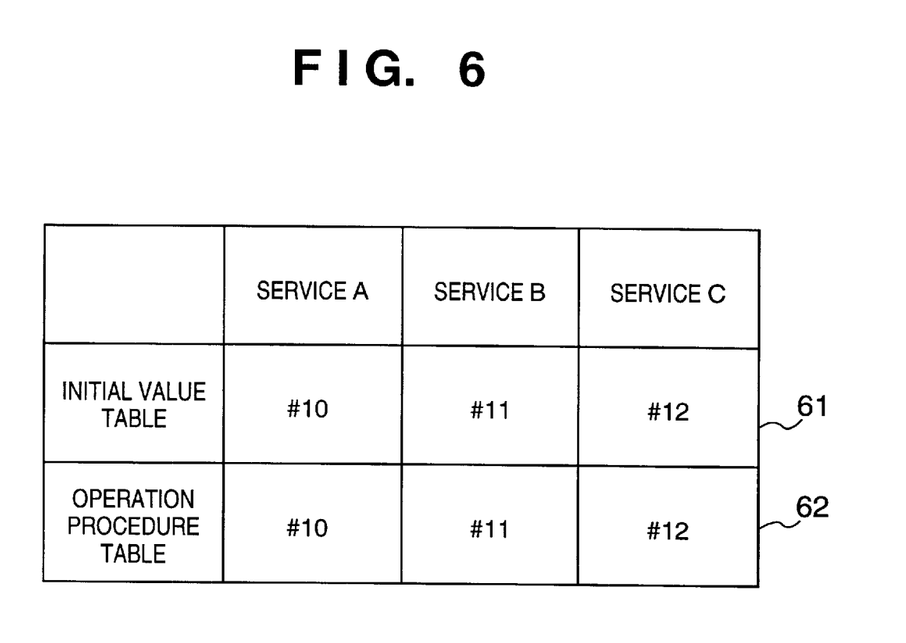

Operation procedure registration will be described with reference to the flow chart of FIG. 5. The mobile communication system of the telecommunications carrier A to which the user has subscribed and registered has services A, B, and C having an operation procedure table as shown in FIG. 6. FIG. 6 is a view showing an initial value table 61 and operation procedure table 62 upon power ON. Upon power ON, the same values as in the initial value table 61 are inputted to the operation procedure table 62. More specifically, #10, #11, and #12 in the initial value table 61 are set in the operation procedure table 62 of the services A, B, and C. The values in the initial value table 61 represent data to be inputted to request the services A, B, and C of the telecommunications carrier A. The services A, B, and C are, e.g., transfer services or automatic answering telephone services.

Figure 7:
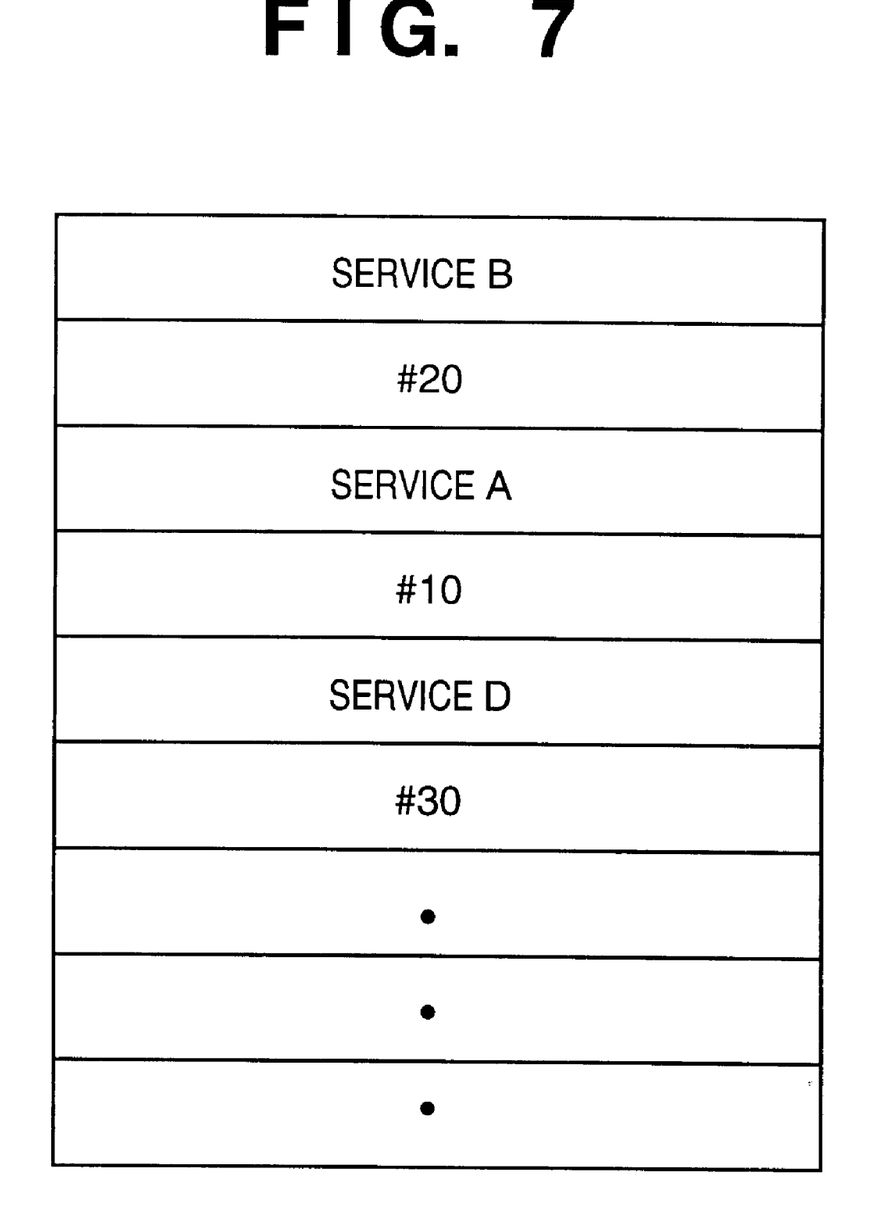
FIG. 7 is a view showing a message to be transmitted.

When the terminal moves to a new area managed by the telecommunications carrier B, the additional service information 211 is transmitted. FIG. 7 is a view showing a message to be transmitted. In this area, the user can receive the services A, B, and D as additional services.

In position information registration processing, the radio section 11 starts this processing upon receiving the above-described additional service information notification 211 shown in FIG. 4, and stores the contents of the notification information in the memory 16 to prevent the notification information from being lost (step S1).

The following processing loop (LOOP) is repeated in correspondence with the number of additional services while looking up the initial value table (step S2). In this embodiment, the number of services is 3. The additional service information of the mobile communication system of the telecommunications carrier A to which the user has subscribed and registered is searched for (step S3). When additional service information is detected, the operation procedure is confirmed (step S4). When the operation procedure remains the same, the flow returns to step S2. On the other hand, when no additional service information is detected in step 53 or a different operation procedure is used in step S4, the operation procedure table 62 is rewritten (step S5).

Figure 8:
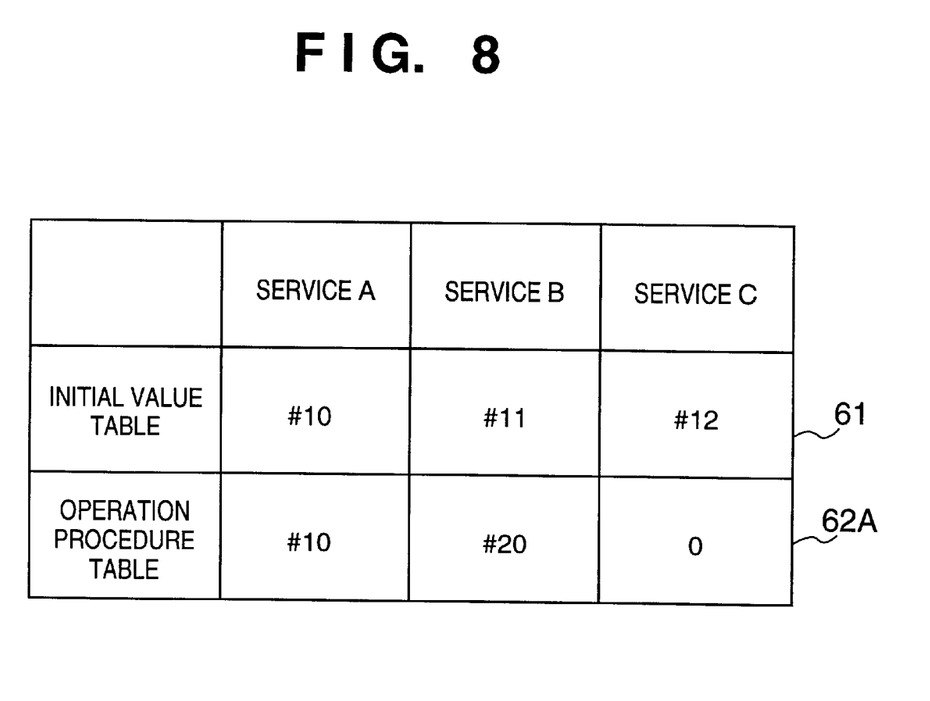
FIG. 8 is a view showing the initial value table and operation procedure table upon completing registration.

With this processing, the vales are changed to those shown in FIG. 8. FIG. 8 is a view showing the initial value table 61 and operation procedure table 62A upon completing registration. The value "0" represents that no service is provided. As described above, since the service C is not available in this area, the operation procedure of service C has the value "0".

Figure 9:
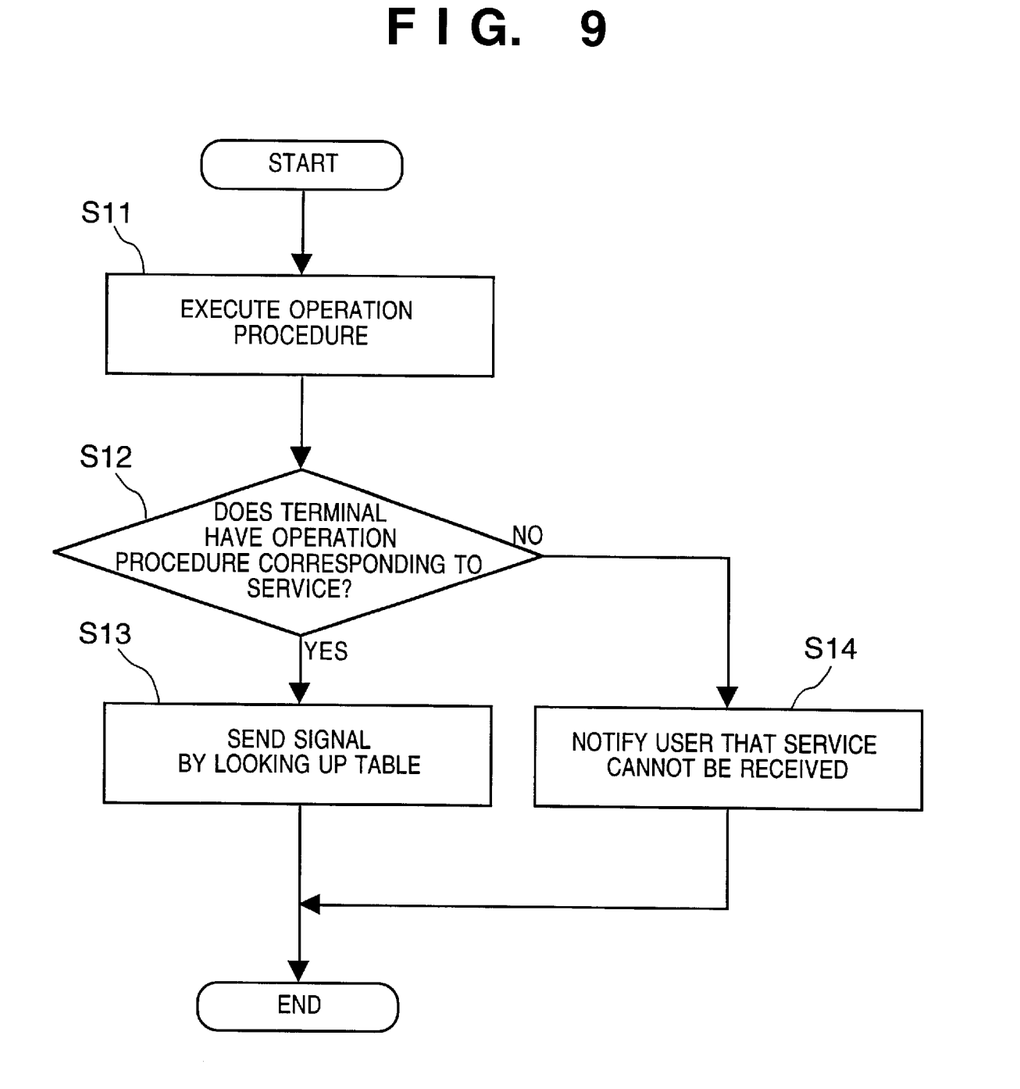
FIG. 9 is a flow chart showing a processing procedure when the user places a call while referring to a memory 16.

FIG. 9 is a flow chart showing a processing procedure when the user makes a call while referring to the memory 16. An operation for receiving an additional service using a terminal which has already been registered will be described with reference to the flow chart of FIG. 9. The operation procedure table 62A for call origination is shown in FIG. 8. The flow charts in FIGS. 5 and 9 show programs read out from the memory 16 by the control section 15 built by a computer.

First, the user dials #11 from the operation section 18 to receive the service B (step S11). The control section 15 determines whether the terminal has an operation procedure table corresponding to the service B (step S12).

If YES in step S12, and the user dials "#11", the control section 15 sends a signal "#20" to the network by looking up the operation procedure table 62A (step S13). If the operation procedure table has the value "0" representing "no service", the control section 15 notifies the user through the display section 17 that the requested service cannot be received (step S14).

With this arrangement, under the control of any other mobile communication system, the user can receive a service using the operation procedure of the mobile communication system of the telecommunications carrier to which the user has subscribed and registered.

When the terminal 103 is in the service zone of the telecommunications carrier A, the operation procedure table 62 for call origination has values shown in FIG. 6, so a dialed signal is directly sent to the network.

The table shown in FIG. 8 may be stored in advance, and a signal corresponding to one of the tables 61 and 62A may be sent to the network depending on the service zone where the terminal is currently present: the service zone of telecommunications carrier A or service zone of telecommunications carrier B.

In FIG. 4, the additional service information is transmitted at the start of position registration sequence. An operation of transmitting the information during the call origination sequence or call reception sequence will be described.

Figure 10:
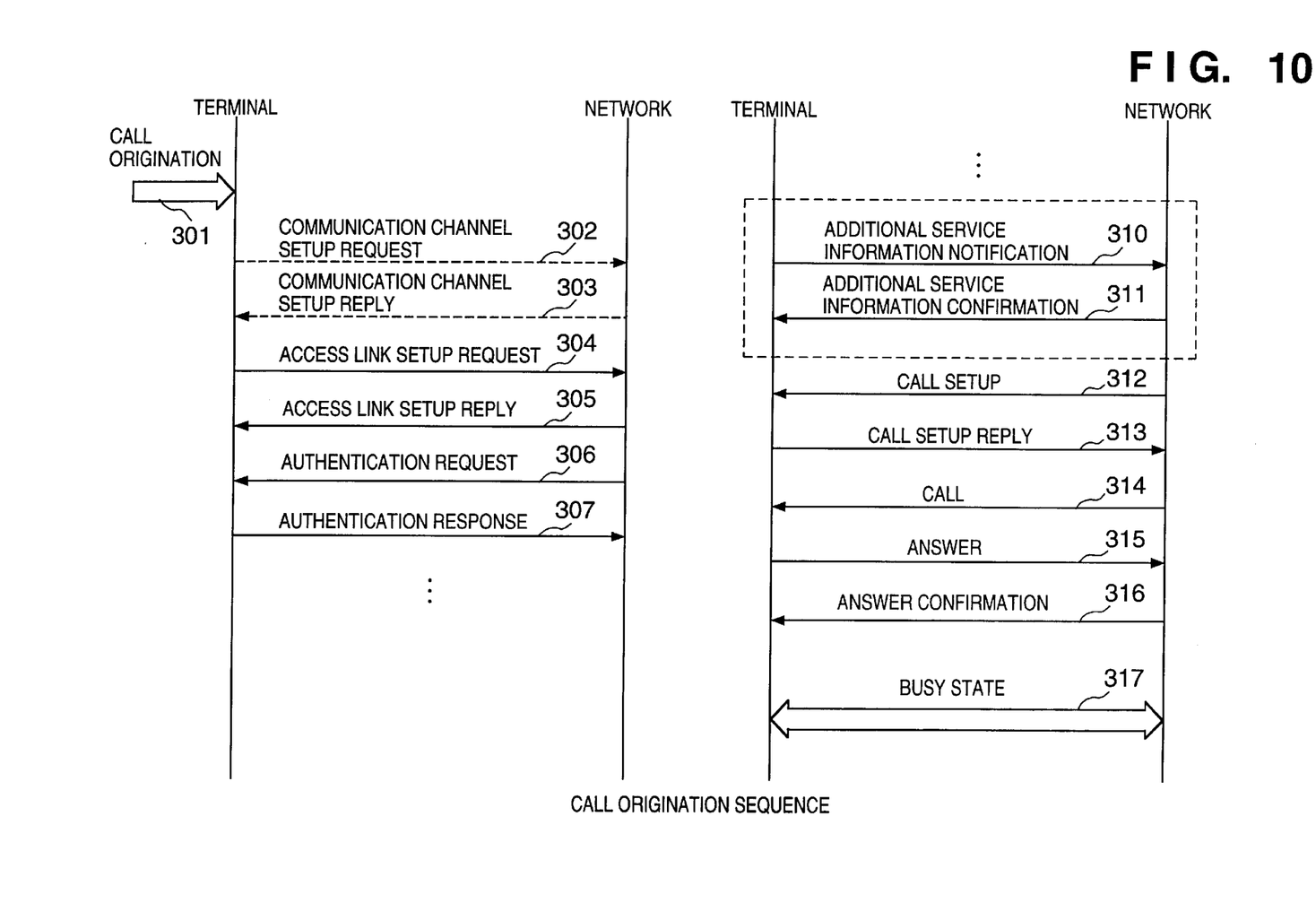
FIG. 10 is a view showing a procedure of transmitting additional service information during the call origination sequence.

FIG. 10 is a view showing a procedure of transmitting additional service information during the call origination sequence. In placing a call, triggered by call origination 301, radio channel setup and authentication processing (communication channel setup request 302 to authentication response 307) are performed. If the control section 24 on the network side deems it necessary (e.g., the additional service information has to be changed, including a change in operation method), the network side notifies the terminal of information 310 such as the contents and operation method of additional services provided by the network after authentication processing.

After it is confirmed that the terminal has normally received the additional service information (311), the processing shifts to a busy state 317 through an caller-side call setup sequence (call setup 312 and answer confirmation 316) and callee-side call setup sequence (call setup reply 313, call 314, and answer 315).

If the additional service information is not transmitted, the processing shifts to the communication state 317 through the call setup 312 to answer confirmation 316 without transmitting the information 310 and 311.

Figure 11:
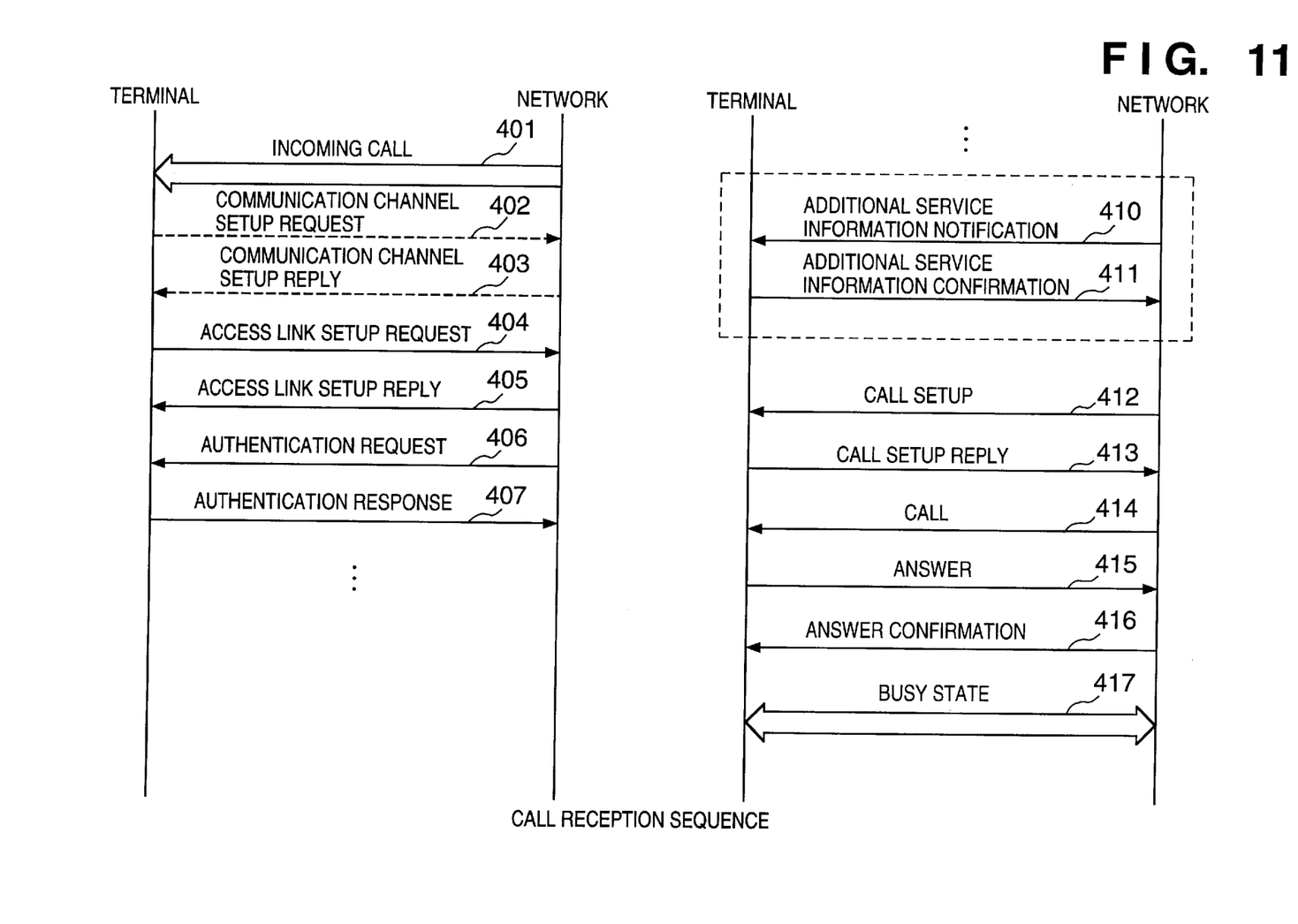
FIG. 11 is a view showing a procedure of transmitting additional service information during the call reception sequence.

FIG. 11 is a view showing a procedure of transmitting additional service information during the call reception sequence. In receiving an incoming call, triggered by an incoming call signal (401) containing call reception information to the terminal, radio channel setup and authentication processing (communication channel setup request 402 to authentication response 407) are performed. If the control section 24 on the network side deems it necessary (e.g., the additional service information has to be changed), the network side notifies the terminal of information 410 such as the contents and operation method of additional services provided by the network after authentication processing.

After it is confirmed that the terminal has normally received the additional service information (411), the processing shifts to a communication state 417 through an caller-side call setup sequence (call setup 412 and answer confirmation 416) and callee-side call setup sequence (call setup reply 413, call 414, and answer 415).

The authentication requests 306 and 406, authentication responses 307 and 407, additional service information notifications 310 and 410, and additional service information confirmation 311 and 411 in FIGS. 10 and 11 correspond to the authentication request 207, authentication response 208, additional service information notification 211, additional service information confirmation 212 in FIG. 4 and steps S207, S208, S211, and S212 in FIG. 12, respectively.

As described above, when the procedure of assigning a temporary terminal identification code to the terminal is performed as needed after authentication/confirmation processing performed in radio channel connection between the network and radio terminal, the terminal is notified of information of additional services provided by the radio network through the display section 17. With this arrangement, not only a radio terminal user who newly enters the radio network by roaming but also a terminal whose position has already been registered before a change in additional service menu on the network wide can be notified of the latest contents and use method of additional service information of the network, so better services can be provided to radio terminal users.

Registration processing (FIG. 5) is also started when the additional service information notification 310 in call origination shown in FIG. 10 or additional service information notification 410 in call reception shown in FIG. 11 is received. This arrangement can flexibly cope with, e.g., a change in additional service information operation method on the network side.

In this embodiment, as a candidate of the IMT 2000 (International Mobile Telecommunication 2000) system as a radio communication system assuming roaming, a mobile communication system of the wideband CDMA (W-CDMA) scheme has been described. However, the present invention is not limited to this and can be effectively applied to assignment of network-side additional service information such as a mobile communication system of the narrow-band CDMA scheme as a radio communication system assuming roaming.

In this embodiment, after additional service information changes, the additional service information is transmitted in the first authentication processing upon making or receiving a call. However, the present invention is not limited to this, and the additional service information may be repeatedly transmitted.

In addition, the present invention can also be applied to a case wherein a program is supplied to the radio terminal apparatus to execute call origination processing using the operation procedure table registration processing shown in FIG. 5 and operation procedure table shown in FIG. 9. In this case, the effect of the present invention can be obtained by loading the program from a storage medium storing the program to the radio terminal apparatus. As the storage medium, a ROM, nonvolatile memory card, IC card, or the like can be used.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus performing communication via a network, comprising:

input means;

receiving means for receiving second data from a second network;

transmitting means for transmitting the second data for requesting a service to the second network in accordance with first data inputted by said input means for requesting the service to a first network; and output means for outputting an output showing that the service requested by the first data is not available in accordance with the second data received from the second network.

2. The apparatus according to claim 1, wherein said transmitting means comprises connecting means for connecting one of the first and second network.

3. The apparatus according to claim 1, wherein the first data includes a number.

4. The apparatus according to claim 1, wherein the service includes a transfer service.

5. The apparatus according to claim 1, wherein the service includes an answering service.

6. The apparatus according to claim 1, wherein said transmitting means transmits the second data on a radio channel.

7. The apparatus according to claim 1, wherein said transmitting means transmits the second data in accordance with a code division multiple access sequence.

8. A method for controlling a communication apparatus performing communication via a network, comprising steps of:

inputting data;

receiving second data from a second network;

transmitting the second data for requesting a service to the second network in accordance with first data inputted at said inputting step for requesting the service to a first network; and outputting an output showing that the service requested by the first data is not available in accordance with the second data received from the second network.

9. The method according to claim 8, wherein the first data includes a number.

10. The method according to claim 8, wherein the service includes a transfer service.

11. The method according to claim 8, wherein the service includes an answering service.

12. The method according to claim 8, wherein the second data is transmitted on a radio channel.

13. A memory medium for storing a program for controlling a communication apparatus performing communication via a network, the program comprising steps of:

inputting data;

receiving second data from a second network;

transmitting the second data for requesting a service to the second network in accordance with first data inputted at said inputting step for requesting the service to a first network; and outputting an output showing that the service requested by the first data is not available in accordance with the second network.

14. The memory medium according to claim 13, wherein the first data includes a number.

15. The memory medium according to claim 13, wherein the service includes a transfer service.

16. The memory medium according to claim 13, wherein the service includes an answering service.

17. The memory medium according to claim 13, wherein the second data is transmitted on a radio channel.

* * * * *

UNITED STATES PATENT AND TRADEMARK OFFICE
CERTIFICATE OF CORRECTION

PATENT NO.    : 6,519,453 B1                                          Page 1 of 1
DATED         : February 11, 2003
INVENTOR(S)   : Masashi Hamada et al.

It is certified that error appears in the above-identified patent and that said Letters Patent is hereby corrected as shown below:

Title page,
Item [56], References Cited, FOREIGN PATENT DOCUMENTS, please delete US 0877531 and insert therefore -- EP 0877531 --

Column 5,
Line 28, please delete "53" and insert therefore -- S3 --

Signed and Sealed this

Twenty-fourth Day of June, 2003

JAMES E. ROGAN
*Director of the United States Patent and Trademark Office*